United States Patent
Shkedi (10) Patent No.: US 9,800,917 B2
(45) Date of Patent: Oct. 24, 2017

(54) TARGETED TELEVISION ADVERTISEMENTS ASSOCIATED WITH ONLINE USERS' PREFERRED TELEVISION PROGRAMS OR CHANNELS

(71) Applicant: INTENT IQ, LLC, Long Island City, NY (US)

(72) Inventor: Roy Shkedi, Forest Hills, NY (US)

(73) Assignee: INTENT IQ, LLC, Long Island City, NY (US)

( * ) Notice: Subject to any disclaimer, the term of this patent is extended or adjusted under 35 U.S.C. 154(b) by 13 days.

(21) Appl. No.: 14/796,269

(22) Filed: Jul. 10, 2015

(65) Prior Publication Data

US 2015/0312614 A1    Oct. 29, 2015

Related U.S. Application Data

(63) Continuation of application No. 12/131,798, filed on Jun. 2, 2008, now Pat. No. 9,083,853.

(51) Int. Cl.
*H04N 21/2668* (2011.01)
*H04N 7/173* (2011.01)
(Continued)

(52) U.S. Cl.
CPC ..... *H04N 21/2668* (2013.01); *G06Q 30/0269* (2013.01); *H04N 7/17318* (2013.01);
(Continued)

(58) Field of Classification Search
None
See application file for complete search history.

(56) References Cited

U.S. PATENT DOCUMENTS 5,848,396 A    12/1998    Gerace
5,855,008 A    12/1998    Goldhaber et al.
(Continued)

FOREIGN PATENT DOCUMENTS

EP    1150508    10/2001
EP    1058999    4/2003
(Continued)

OTHER PUBLICATIONS

Battelle, John; "The Search—How Google and Its Rivals Rewrote the Rules of Business and Transformed Our Culture"; pp. 167-171; 2005.
(Continued)

*Primary Examiner* — Jonathan V Lewis
(74) *Attorney, Agent, or Firm* — Louis J. Hoffman; David S. Alavi (57) ABSTRACT

In an automatic, computer-implemented method, a selected television advertisement is presented automatically in association with a television program or channel, which in turn is selected based at least in part on information from an online user profile that contains information indicating a user's preference for that television program or channel. The television advertisement is selected based at least in part on additional information from the online user profile that is unrelated to the selected television program or channel. The selected television advertisement is presented on or during the selected television program or channel via a set-top box, which has a set-top box identifier associated with the online user profile.

21 Claims, 5 Drawing Sheets

(51) Int. Cl.
    *H04N 21/258* (2011.01)
    *H04N 21/466* (2011.01)
    *H04N 21/475* (2011.01)
    *H04N 21/61* (2011.01)
    *H04N 21/81* (2011.01)
    *G06Q 30/02* (2012.01)
    *H04N 21/458* (2011.01)
    *H04N 21/643* (2011.01)

(52) U.S. Cl.
    CPC . *H04N 21/25858* (2013.01); *H04N 21/25891* (2013.01); *H04N 21/458* (2013.01); *H04N 21/4668* (2013.01); *H04N 21/4755* (2013.01); *H04N 21/6175* (2013.01); *H04N 21/64322* (2013.01); *H04N 21/812* (2013.01)

(56) References Cited

U.S. PATENT DOCUMENTS

| | | | |
|---|---|---|---|
| 5,933,811 A | 8/1999 | Angles et al. | |
| 5,945,988 A * | 8/1999 | Williams | G11B 27/105 348/E17.005 |
| 5,948,061 A | 9/1999 | Merriman | |
| 6,160,989 A | 12/2000 | Hendricks et al. | |
| 6,216,129 B1 | 4/2001 | Eldering | |
| 6,366,298 B1 | 4/2002 | Haitsuka et al. | |
| 6,377,986 B1 | 4/2002 | Philyaw | |
| 6,385,592 B1 | 5/2002 | Angles et al. | |
| 6,446,261 B1 | 9/2002 | Rosser | |
| 6,718,551 B1 * | 4/2004 | Swix | G06Q 30/02 348/E7.075 |
| 6,771,290 B1 | 8/2004 | Hoyle | |
| 6,832,207 B1 | 12/2004 | Shkedi | |
| 6,845,396 B1 | 1/2005 | Kanojia | |
| 6,868,392 B1 | 3/2005 | Ogasawara | |
| 6,925,440 B1 | 8/2005 | Shkedi | |
| 6,944,585 B1 * | 9/2005 | Pawson | G06F 17/30035 348/14.01 |
| 6,973,436 B1 | 12/2005 | Shkedi | |
| 7,072,853 B2 | 7/2006 | Shkedi | |
| 7,092,926 B2 | 8/2006 | Cerrato | |
| 7,100,183 B2 | 8/2006 | Kunkel et al. | |
| 7,152,237 B2 | 12/2006 | Flickinger et al. | |
| 7,158,943 B2 | 1/2007 | van der Riet | |
| 7,260,823 B2 | 8/2007 | Schlack et al. | |
| 7,328,448 B2 | 2/2008 | Eldering et al. | |
| 7,337,127 B1 * | 2/2008 | Smith | G06Q 30/02 345/592 |
| 7,428,493 B2 | 9/2008 | Shkedi | |
| 7,454,364 B2 | 11/2008 | Shkedi | |
| 7,747,745 B2 | 6/2010 | Shkedi | |
| 7,806,329 B2 | 10/2010 | Dmitriev et al. | |
| 7,822,637 B2 | 10/2010 | Shkedi | |
| 7,822,639 B2 | 10/2010 | Shkedi | |
| 7,861,260 B2 | 12/2010 | Shkedi | |
| 7,890,609 B2 | 2/2011 | Shkedi | |
| 7,925,549 B2 | 4/2011 | Looney et al. | |
| 7,966,647 B1 | 6/2011 | Igoe et al. | |
| 7,979,307 B2 | 7/2011 | Shkedi | |
| 8,015,286 B2 | 9/2011 | Jenkins | |
| 8,051,444 B2 | 11/2011 | Shkedi | |
| 8,079,048 B2 | 12/2011 | Howcroft | |
| 8,086,491 B1 | 12/2011 | Matz et al. | |
| 8,200,822 B1 | 6/2012 | Shkedi | |
| 8,204,783 B2 | 6/2012 | Shkedi | |
| 8,204,965 B2 | 6/2012 | Shkedi | |
| 8,239,264 B2 | 8/2012 | Shkedi | |
| 8,244,574 B2 | 8/2012 | Shkedi | |
| 8,244,582 B2 | 8/2012 | Shkedi | |
| 8,244,583 B2 | 8/2012 | Shkedi | |
| 8,244,586 B2 | 8/2012 | Shkedi | |
| 8,280,758 B2 | 10/2012 | Shkedi | |
| 8,281,336 B2 | 10/2012 | Shkedi | |
| 8,296,793 B2 * | 10/2012 | Johnson | H04N 7/16 705/14.49 |
| 8,341,247 B2 | 12/2012 | Shkedi | |
| 8,438,062 B2 | 5/2013 | Rohan et al. | |
| 8,494,904 B2 | 7/2013 | Shkedi | |
| 8,505,046 B2 | 8/2013 | Small et al. | |
| 8,522,271 B2 | 8/2013 | Childress et al. | |
| 8,566,164 B2 | 10/2013 | Shkedi | |
| 8,589,210 B2 | 11/2013 | Shkedi | |
| 8,595,069 B2 | 11/2013 | Shkedi | |
| 8,600,815 B2 | 12/2013 | Shkedi | |
| 8,607,267 B2 | 12/2013 | Shkedi | |
| 8,635,649 B2 * | 1/2014 | Ward, III | H04N 5/44543 725/32 |
| 8,671,139 B2 | 3/2014 | Shkedi | |
| 8,677,398 B2 | 3/2014 | Shkedi | |
| 8,695,032 B2 | 4/2014 | Shkedi | |
| 8,713,600 B2 | 4/2014 | Shkedi | |
| 8,775,249 B2 | 7/2014 | Shkedi | |
| 8,788,319 B2 | 7/2014 | Carpenter et al. | |
| 8,959,146 B2 | 2/2015 | Shkedi | |
| 8,997,138 B2 | 3/2015 | Shkedi | |
| 9,076,154 B1 * | 7/2015 | Song | G06Q 30/02 |
| 9,299,077 B2 * | 3/2016 | Brubaker | G06F 17/30867 |
| 2001/0003184 A1 | 6/2001 | Ching et al. | |
| 2001/0049620 A1 * | 12/2001 | Blasko | G06Q 10/10 705/14.53 |
| 2002/0010928 A1 | 1/2002 | Sahota | |
| 2002/0013943 A1 | 1/2002 | Haberman et al. | |
| 2002/0019769 A1 | 2/2002 | Barrits et al. | |
| 2002/0032603 A1 | 3/2002 | Yeiser | |
| 2002/0056088 A1 | 5/2002 | Silva et al. | |
| 2002/0059094 A1 | 5/2002 | Hosea et al. | |
| 2002/0078444 A1 | 6/2002 | Krewin et al. | |
| 2002/0082910 A1 | 6/2002 | Kontogouris | |
| 2002/0083464 A1 * | 6/2002 | Tomsen | H04N 5/4401 725/112 |
| 2002/0120929 A1 | 8/2002 | Schwalb et al. | |
| 2002/0120933 A1 | 8/2002 | Knudson et al. | |
| 2002/0123928 A1 | 9/2002 | Eldering et al. | |
| 2002/0124249 A1 | 9/2002 | Shintani | |
| 2002/0124253 A1 | 9/2002 | Eyer et al. | |
| 2002/0129362 A1 | 9/2002 | Chang et al. | |
| 2002/0194058 A1 | 12/2002 | Eldering | |
| 2002/0194604 A1 | 12/2002 | Sanchez et al. | |
| 2003/0051242 A1 | 3/2003 | Donnelly | |
| 2003/0066078 A1 | 4/2003 | Bjorgan et al. | |
| 2003/0080997 A1 | 5/2003 | Fuehren et al. | |
| 2003/0093311 A1 | 5/2003 | Knowlson | |
| 2003/0093792 A1 | 5/2003 | Labeeb | |
| 2003/0131355 A1 | 7/2003 | Berenson et al. | |
| 2003/0135853 A1 | 7/2003 | Goldman et al. | |
| 2003/0145323 A1 | 7/2003 | Hendricks et al. | |
| 2003/0149975 A1 | 8/2003 | Eldering et al. | |
| 2003/0208756 A1 | 11/2003 | Macrae et al. | |
| 2003/0208758 A1 | 11/2003 | Schein et al. | |
| 2003/0221191 A1 | 11/2003 | Khusheim | |
| 2003/0229900 A1 | 12/2003 | Reisman | |
| 2004/0010546 A1 | 1/2004 | Klug et al. | |
| 2004/0031058 A1 | 2/2004 | Reisman | |
| 2004/0068744 A1 | 4/2004 | Claussen et al. | |
| 2004/0073915 A1 | 4/2004 | Dureau | |
| 2004/0078809 A1 | 4/2004 | Drazin | |
| 2004/0107437 A1 | 6/2004 | Reichardt et al. | |
| 2004/0117827 A1 | 6/2004 | Karaoguz et al. | |
| 2004/0163101 A1 | 8/2004 | Swix et al. | |
| 2004/0172650 A1 | 9/2004 | Hawkins et al. | |
| 2005/0086112 A1 | 4/2005 | Shkedi | |
| 2005/0165638 A1 | 7/2005 | Piller | |
| 2005/0165644 A1 * | 7/2005 | Beyda | G06Q 30/02 705/14.56 |
| 2005/0246736 A1 | 11/2005 | Beyda et al. | |
| 2005/0283796 A1 | 12/2005 | Flickinger | |
| 2006/0116924 A1 | 6/2006 | Angles et al. | |
| 2006/0195441 A1 * | 8/2006 | Julia | G06F 17/30035 |
| 2006/0212900 A1 | 9/2006 | Ismail et al. | |
| 2006/0248570 A1 | 11/2006 | Witwer | |
| 2006/0253323 A1 | 11/2006 | Phan et al. | |
| 2006/0271953 A1 | 11/2006 | Jacoby et al. | |
| 2006/0277569 A1 | 12/2006 | Smith | |
| 2007/0022032 A1 | 1/2007 | Anderson et al. | |

(56) References Cited

U.S. PATENT DOCUMENTS

| | | |
|---|---|---|
| 2007/0038516 A1 | 2/2007 | Apple et al. |
| 2007/0073585 A1 | 3/2007 | Apple et al. |
| 2007/0100690 A1 | 5/2007 | Hopkins |
| 2007/0157228 A1 | 7/2007 | Bayer et al. |
| 2007/0180469 A1 | 8/2007 | Finley et al. |
| 2007/0198327 A1 | 8/2007 | Yazdani et al. |
| 2007/0204297 A1 | 8/2007 | Gonzalez |
| 2007/0220553 A1 | 9/2007 | Branam |
| 2007/0233571 A1 | 10/2007 | Eldering et al. |
| 2007/0244750 A1 | 10/2007 | Grannan et al. |
| 2007/0266400 A1 | 11/2007 | Rogers et al. |
| 2007/0266403 A1 | 11/2007 | Ou et al. |
| 2007/0283384 A1* | 12/2007 | Haeuser .......... H04N 7/165 725/34 |
| 2007/0294721 A1 | 12/2007 | Haeuser et al. |
| 2008/0016540 A1 | 1/2008 | Savoor et al. |
| 2008/0040742 A1* | 2/2008 | Howcroft ......... H04N 7/17327 725/34 |
| 2008/0046917 A1 | 2/2008 | de Heer |
| 2008/0092155 A1* | 4/2008 | Ferrone .......... H04N 21/25883 725/9 |
| 2008/0109376 A1 | 5/2008 | Walsh et al. |
| 2008/0155613 A1 | 6/2008 | Benya et al. |
| 2008/0181225 A1 | 7/2008 | Zampiello |
| 2008/0189360 A1 | 8/2008 | Kiley et al. |
| 2008/0201733 A1 | 8/2008 | Ertugrul et al. |
| 2008/0243822 A1 | 10/2008 | Campbell et al. |
| 2008/0281699 A1* | 11/2008 | Whitehead ........ G06Q 30/02 705/14.41 |
| 2009/0055862 A1* | 2/2009 | Knoller ........... H04N 21/2665 725/34 |
| 2009/0131152 A1* | 5/2009 | Busse ............. G07F 17/32 463/23 |
| 2009/0150927 A1 | 6/2009 | Kouhi et al. |
| 2009/0171780 A1 | 7/2009 | Aldrey et al. |
| 2009/0172723 A1 | 7/2009 | Shkedi et al. |
| 2009/0187944 A1 | 7/2009 | White et al. |
| 2009/0298514 A1* | 12/2009 | Ullah ............. G01S 5/02 455/456.5 |
| 2010/0058383 A1 | 3/2010 | Chang et al. |
| 2010/0192172 A1 | 7/2010 | Thomas et al. |
| 2010/0287048 A1* | 11/2010 | Ramer ............. G06Q 30/02 705/14.46 |
| 2011/0040607 A1 | 2/2011 | Shkedi |
| 2011/0258049 A1 | 10/2011 | Ramer et al. |
| 2012/0023522 A1 | 1/2012 | Anderson |
| 2012/0066385 A1 | 3/2012 | Jenkins |
| 2012/0314140 A1 | 12/2012 | Wiser et al. |
| 2013/0104159 A1 | 4/2013 | John |
| 2013/0254035 A1 | 9/2013 | Ramer et al. |
| 2014/0215503 A1 | 7/2014 | Pharn |
| 2014/0229274 A1* | 8/2014 | Abhyanker ....... G06Q 30/0261 705/14.46 |

FOREIGN PATENT DOCUMENTS

| | | |
|---|---|---|
| JP | 2003-331183 | 11/2003 |
| JP | 2004-507990 A | 3/2004 |
| JP | 2004-320754 | 11/2004 |
| JP | 2005-311810 | 11/2005 |
| JP | 2006-324763 | 11/2006 |
| JP | 2007-274246 | 10/2007 |
| JP | 2008-125022 | 5/2008 |
| KR | 10-0793513 | 3/2006 |
| KR | 1008141290000 | 3/2008 |
| WO | WO01/93161 | 12/2001 |
| WO | WO02/19720 | 3/2002 |
| WO | WO2005046237 | 5/2005 |

OTHER PUBLICATIONS

"BSkyB in Google Link-up"; Financial Times (FT.com); Dec. 6, 2006.

"Google moves into TV ads with BSkyB Deal"; Guardian Unlimited; Dec. 7, 2006.

Chen, Andy; "The New Behavioral Wunder"; from webpage http://www.clickz.com; Apr. 11, 2007.

Keegan, Paul; "The Man Who Can Save Advertising"; from http://money.cnn.com; Nov. 1, 2004.

"Visible World Targets Advertising Industry"; from http://informitv.com; Feb. 20, 2005.

"Venture Market Summary"; VentureWire al.ert; Mar. 29, 2005.

"This Ad's for You—Just You"; BusinessWeek online; Jun. 28, 2005."This Ad's for You—Just You"; BusinessWeek online; Jun. 28, 2005.

"Cable's Big Bet on Hyper-Targeting. Time Warner will test new software that sends different ads to different viewers."; BusinessWire online; Jul. 4, 2005.

"TiVo Launches New Interactive Advertising Technology"; press release from www.tivo.com; Jul. 18, 2005.

"TiVo Announces First Advertising Search Product for Television"; press release from www.tivo.com; Nov. 28, 2005.

"TiVo Begins Rollout of Online Services Now Accessible Directly on the TV"; press release from www.tivo.com; Dec. 1, 2005.

"TiVo Launches Television's New Advertising Search Product"; press release from www.tivo.com; May 8, 2006.

Shukla, Anuradha; "Visible World Offers 'Any Screen' Solution for Customized Video Advertising"; from www.tmcnet.com; Feb. 6, 2007.

Story, Louise; "The Web drives an advertising boom without the need for agencies"; International Herald Tribune (iht.com); Feb. 8, 2007.

PCT International Preliminary Report on Patentability and Written Opinion of the International Searching Authority in PCT /US2009/046031, Dec. 16, 2010.

PCT International Preliminary Report on Patentability and Written Opinion of the International Searching Authority in PCT/US2009/046033, Dec. 16, 2010.

U.S. Appl. No. 13/274,242, filed Oct. 14, 2011, Earliest Parent Filing Date Oct. 15, 2010 (prov.).

U.S. Appl. No. 14/101,156, filed Dec. 9, 2013, Earliest Parent Filing Date Jun. 2, 2008.

U.S. Appl. No. 14/246,525, filed Apr. 7, 2014, Earliest Parent Filing Date Apr. 17, 2007.

U.S. Appl. No. 14/620,502, filed Feb. 12, 2015, Earliest Parent Filing Date Jun. 16, 2006 (prov.).

U.S. Appl. No. 14/751,672, filed Jun. 26, 2015, Earliest Parent Filing Date Jun. 5, 2012 (prov.).

U.S. Appl. No. 14/790,370, filed Jul. 2, 2015, Earliest Parent Filing Date Aug. 3, 2011 (prov.).

U.S. Appl. No. 12/536,451, filed Aug. 5, 2009.

U.S. Appl. No. 12/912,726, filed Oct. 26, 2010, Earliest Parent Filing Date Dec. 28, 1999.

U.S. Appl. No. 14/080,999, filed Nov. 15, 2013, Earliest Parent Filing Date Jun. 19, 2006 (prov.).

U.S. Appl. No. 14/089,645, filed Nov. 25, 2013, Earliest Parent Filing Date Dec. 31, 2007.

U.S. Appl. No. 14/091,285, filed Nov. 26, 2013, Earliest Parent Filing Date Nov. 28, 2000.

U.S. Appl. No. 14/204,958, filed Mar. 11, 2014, Earliest Parent Filing Date Jun. 14, 2000.

U.S. Appl. No. 14/763,963, filed Jul. 28, 2015, Earliest Parent Filing Date Jan. 30, 2013.

U.S. Appl. No. 14/946,623, filed Nov. 19, 2015, Earliest Parent Filing Date Jun. 2, 2008.

U.S. Appl. No. 14/960,237, filed Dec. 4, 2015, Earliest Parent Filing Date Jun. 16, 2006 (prov.).

U.S. Appl. No. 15/047,386, filed Feb. 18, 2016, Earliest Parent Filing Date Aug. 3, 2011 (prov.).

U.S. Appl. No. 15/161,794, filed May 23, 2016, Earliest Parent Filing Date Jun. 5, 2012 (prov.).

U.S. Appl. No. 15/179,356, filed Jun. 10, 2016, Earliest Parent Filing Date Apr. 17, 2007.

* cited by examiner

FIG. 4C

TARGETED TELEVISION ADVERTISEMENTS ASSOCIATED WITH ONLINE USERS' PREFERRED TELEVISION PROGRAMS OR CHANNELS

CROSS-REFERENCE TO RELATED APPLICATIONS

This application is a continuation of application Ser. No. 12/131,798, filed Jun. 2, 2008, now U.S. Pat. No. 9,083,853.

BACKGROUND

The field of the present invention relates to presenting television advertisements that are targeted based on online user profiles. In particular, systems and methods are described for presenting targeted television advertisements during television programs for which an online user has expressed a preference or affinity.

A variety of systems and methods currently target advertisements based on user/viewer/customer behavior. Many of those rely on collection of personally identifiable information (PII) to correlate the person exhibiting the behavior with advertisements targeted at that person. In some systems, advertisements can be targeted without collecting PII, but in such systems, typically, the advertisement is delivered over the same medium as the medium in which the non-personally identifiable information is measured or collected. For example, many grocery stores hand out so-called "club cards," which can but need not be linked to PII. A shopper presents the card at checkout to receive various discounts, thereby allowing the store to link a list of purchased items to the card. As the system "learns" the purchasing habits of that cardholder, it can begin issuing coupons targeted at purchases that the cardholder has made previously or that the system predicts the cardholder may wish to make based on past purchases. In another example, online advertisements can be targeted based on an Internet user's online activities without using PII. The use of browser cookies enables an ad server to recognize an Internet site visitor (more accurately, the computer or other device used by the visitor) who has previously conducted searches, accessed content, or viewed ads at the same or a different site linked to the ad server. The ad server can target future advertising to the site visitor based on that previous activity, again without necessarily using PII. A user who has searched for airline tickets to southern California on an online travel site, for instance, might later receive targeted online advertisements for Disneyland, which the ad server (the one that collected or received the user's search information from the online travel site) delivers to the user's computer, perhaps while the user is visiting another online site.

Targeting of advertisements becomes significantly more problematic to deliver "cross-medium," i.e., when an advertisement is presented via one medium based on user behavior exhibited, or demographic information learned, in another medium. One example of cross-medium advertising is presentation of television advertisements that are targeted based on an online user profile. One difficulty, however, arises from the need to associate an online access device (e.g., a computer connected to the Internet) and a corresponding television device (e.g., a set-top box). Use of PII can facilitate the proper association. A few methods have been developed to associate computer and TV units without using PII, including, for example, those disclosed in this inventor's U.S. applications Ser. Nos. 11/736,544 (entitled "Targeted television advertisements based on online behavior" filed Apr. 17, 2007 in the name of Roy Shkedi) and Ser. No. 11/968,117 filed (entitled "Targeted online advertisements based on viewing or interacting with television advertisements" Dec. 31, 2007 in the names of Roy Shkedi and Ronen Shlomo), both of which applications being hereby incorporated by reference in their entirety. Other methods for establishing such associations may exist or may be developed in the future. However the association is made (with or without PII), information from an online user profile collected or generated during computer access of the Internet in a household can be used to select a targeted television advertisement, which can be presented via the set-top box in the household that is associated with the computer.

A problem remains, however, because a household may include multiple users, each of whom independently access online content and independently watch television. A targeted advertisement selected based on online user profile information for a first household member might be wasted if presented to a second household member, especially one for whom the targeted advertisement might not be suitable or effective. For example, a television advertisement for investment advice targeted based on the ad server having recognizing that Dad had checked his online investment account would be wasted if presented on television while Daughter watches a pop music show, even though the ad server has determined that Dad's computer is associated with the set-top box connected to the television watched by Daughter.

It is therefore desirable to provide systems and methods for increasing the probability that a television advertisement targeted based on an online user profile is presented while the corresponding user (i.e., the "target") watches television.

SUMMARY

An automatic, computer-implemented method comprises automatically arranging for presenting, in association with a selected television program or channel, a selected television advertisement. The television program or channel is selected based at least in part on information from an online user profile, with that information specifically indicating a user's preference for, or affinity to, that television program or channel. The television advertisement is selected based at least in part on additional information from the online user profile that is unrelated to the selected television program or channel. The selected television advertisement is presented via a set-top box on the selected television program or channel, with the set-top box being identified by a corresponding set-top box identifier that is associated with the online user profile.

Objects and advantages pertaining to presenting television advertisements targeted based on online user profiles may become apparent upon referring to the exemplary embodiments illustrated in the drawings and disclosed in the following written description or appended claims.

The embodiments shown in the figures are exemplary and should not be construed as limiting the scope of the present disclosure or appended claims.

DETAILED DESCRIPTION OF EMBODIMENTS

Some of the terms used in the present disclosure or appended claims are defined as follows.

Television provider (TVP)—an entity that provides television service to a subscriber or user via any suitable transmission medium, including but not limited to coaxial cable, fiber-optical cable, network cable, phone line, satellite transmission, VHF or UHF transmission, other over-the-air transmission, or wireless transmission, e.g., via mobile phone infrastructure.

Internet service provider (ISP; equivalently, an online access provider)—an entity that provides online access to a subscriber or user via any suitable transmission medium, including but not limited to coaxial cable, fiber-optical cable, network cable, phone line, satellite transmission, wireless transmission (e.g., WiMax, WiFi, or other IEEE 802 wireless protocols), or VHF or UHF transmission. The online access enables the subscriber to access the Internet and its myriad online sites, or to access any future network successor to the Internet.

ISP/TVP—in some instances a single entity (or providers controlled by a single entity) can provide to one or more subscribers or users both television service and online access. Such an entity is referred to herein as an ISP/TVP. Although an ISP and a TVP are represented schematically in the drawings by separate labeled boxes, the drawings are intended to encompass implementations in which the ISP and the TVP are independent entities as well as other implementations in which a common ISP/TVP provides both services.

Set-top box (STB)—a device that connects a television and a television signal source. The STB receives an incoming television signal, extracts content from the received signal, and transmits the extracted content to the television to be presented to a viewer. The television signal source can be one or more of a computer network cable (e.g., an Ethernet or other transmission-speed cable), a satellite dish, a coaxial cable connected to a cable television system, a telephone line or digital subscriber line (DSL), a wireless network connection, an antenna (VHF, UHF, digital, or other), or another suitable signal source. The content can include, but is not limited to, video (which often can include an audio portion), audio, Internet web pages, interactive games, or other content. An STB may or may not include a dedicated television tuner. Each STB typically is assigned an identifier of some sort by the corresponding TVP, e.g., to enable the TVP to direct specific signals or programming to a specific STB, to identify the source of requests, commands, queries, or responses received from a particular STB, or for other purposes. In some instances such an STB identifier might be known only to the corresponding TVP and not available for outside communication. If the STB is connected to the Internet as a signal source (directly, through another device, or through the corresponding TVP; connected to the Internet only, or also connected in parallel to another signal source such as a cable television transmission infrastructure), the STB identifier can include an STB IP address (i.e., an Internet Protocol address) or a portion thereof. If the STB is connected to both the Internet and another signal source, the STB identifier can include an identifier specific to the other signal source in addition to the STB IP address. In some instances the STB identifier is static, while in other instances the STB identifier is dynamic and can change from time to time. Sometimes, the STB identifier can involve a STB IP address and other times it can be an identifier used by an infrastructure company (e.g., a cable company) to identify its STBs.

Despite its name, an STB need not be physically located on top of a television set literally. Under current technology, STBs often are located physically adjacent to the television set, such as in a media cabinet or the like, but it is not even necessary that the STB be located in proximity to the television. Nor is it necessary that the STB be a box, literally. Rather, a STB might be implemented, for example, as a circuit board, integrated circuit, set of integrated circuits, or software that is physically integrated with another "box," such as the television, a cable or other connection, a computer, or a building equipment or junction box, which also has other functions, or without being housed in any "box" at all.

Digital video recorder (DVR, alternatively personal video recorder or PVR)—a device that stores video content in a digitally encoded format on a digital storage medium, such as a hard drive, and enables playback of the stored content. A DVR can comprise a stand-alone unit connected to a television, a component of an STB, or a signal source, or the DVR can comprise software that programs a computer to perform DVR storage and playback functions.

Video-on-Demand (VOD)—a system that allows users to select and view video content delivered from a signal source in response to a request from the user. Typically, the requested video content can be viewed at a time of the user's own choosing and can be paused, rewound, or fast-forwarded as desired by the user. A VOD system can "stream" the content (enabling viewing of portions of a requested item of video content while other portions are still being delivered from the signal source), or the VOD system can "download" the content and allow viewing only after a complete item is delivered from the signal source. Some VOD systems allow users to select and watch video content over a network as part of an interactive television system.

Interactive Television (interactive TV, iTV, idTV, or ITV)—any television system that enables a viewer to interact with video content delivered to a television. Interactive television can include, but is not limited to, access to Web sites through TV "crossover links," electronic mail and online chat, online commerce, or enhanced graphics (relative to standard television offerings).

Internet Protocol Television (IPTV)—a system wherein television content is delivered via a computer network using Internet Protocol (IP). For residential users, IPTV is often provided in conjunction with Video on Demand and can also be bundled with Internet services such as Internet access and Voice-over-IP (VoIP). Commercial bundling of TV, VoIP, and Internet access is sometimes referred to in the industry as a "triple play." Additional telecommunications services (e.g., mobile voice or data service) can be added, yielding a "quadruple play" and so forth. IPTV typically is supplied by a broadband service provider using a closed network infrastructure. IPTV also can be provided over the Internet or other publicly accessible computer network, in which case it might be referred to as Internet TV or TV-over-Internet. IPTV also can be used to deliver video or other content over a corporate LAN or other business network.

Online user interface device—any user interface device used to access a remote network such as the Internet, including but not limited to a cell phone or mobile handset, a personal digital assistant (PDA), or a networked computer (desktop, workstation, notebook, laptop, or other).

Online access device—any device used to connect an online user interface device to a remote network such as the Internet, including but not limited to a modem, a wired or wireless router, a wireless access point, a wired network adapter (e.g., Ethernet adapter), a wireless network adapter (e.g., IEEE 802.11, ED-VO, EDGE, HSPA, CDMA, GSM, or other), or an optical fiber based network adapter (e.g., a network interface unit or optical network terminal). Different types of online access devices can be and sometimes are combined into a single unit (e.g., a modem that also functions as a router for a LAN). An online user interface device and an online access device can be, and sometimes are, combined into a single unit (e.g., a computer with a built-in Ethernet adapter, wireless adapter, or modem). Each online access device typically is identified on the Internet by an Internet Protocol address (i.e., an IP address; currently, under IPv4, an IP address comprises a sequence of four numbers each ranging from 0 to 255, i.e., a 32-bit address; eventually, under IPv6, an IP address will comprise a 128-bit address). Every transmission of data over the Internet includes a destination IP address to enable the transmitted data to reach its intended destination. In some instances an online device has a static IP address, while in other, more common instances an online access device has an IP address that is dynamic and changes from time to time. Although IP addresses are referred to herein for enabling data transmitted via the Internet to reach its intended destination, that terminology is intended to encompass any functionally equivalent online access device identifier employed to route such transmitted data to its intended destination through the Internet or through any future successor network. For example, under IPv6, 128-bit addresses will be employed. Various examples of online access identifiers are described below, including those that comprise an IP address or a portion thereof.

User (equivalently, subscriber or viewer)—a person receiving online access or television service at a delivery end-point within a household, office, business, or other site or establishment served by an online access provider or television service provider. Multiple users can be located at a single site or establishment. Television ads or programming can be presented on one television set or multiple sets of a given user; likewise, online access or ad delivery can involve one or more computers or other online interface devices of the user. In some instances, a business having multiple physical locations may be served by separate online or television services, but in other instances, a business may have an internal LAN or WAN that extends service provided to multiple physical locations. Also, some computers and televisions are portable and can access the service provided from remote locations. Accordingly, the term "user" is intended to refer to that person who receives the provided services and does not require a fixed or single location in such instances.

User profile—information concerning a specific user of online access or television service. The profile information can be demographic, can be based on observed online or television-related activity or behavior of the user, or can be based on declared information provided by or reported about the user. The profile information can be explicit (e.g., declared or reported) or implicit (e.g., inferred on the basis of other information in the profile). A user profile can be referred to as an online user profile or a television user profile as appropriate if it includes information collected or generated via only one of those media. The user profile can be collected or generated by one or more sources (i.e., profile providers, see below). The user profile can be stored locally on a user's computer or set-top box (e.g., as browser cookies) or remotely on one or more servers, ad servers, or online sites, or at various combinations of those. A single entity can control such multiple locations, or separate entities can control different ones of the locations separately. Various portions of the profile can be linked to or associated with one another in any suitable way, e.g., by each including or referring to a common user name, IP address or other online access identifier, or cookie or tag placed on the user's computer. Whatever the manner and location of storage (local or remote, single location or distributed, single- or multiple-entity control), the totality of the profile information associated with a given user can be referred to collectively as "the user profile."

Behavioral targeting—the delivery of specific advertisements to a user, the advertisements being selected on the basis of activity of the user, typically recent activity, including but not limited to: online or television-based searches conducted by the user; content viewed or otherwise accessed by the user online or on television; online or television advertisements viewed, clicked on, interacted with, or otherwise accessed by the user; shopping or purchases made by the user online or through a television; and any other form of previous user online or television activity.

Central Ad Server (CAS)—a computer server that manages delivery of advertisements (television or online) to visitors of online sites or viewers of television programs. A local ad server can be typically run by a single publisher to serve ads to visitors of websites or viewers of television programs of that publisher, or by a single advertiser to serve ads into ad space acquired by the advertiser on various websites or television programs. A third-party or remote ad server typically is remotely located and delivers advertisements of various advertisers to visitors of websites or viewers of programs of multiple publishers. The remote ad server acts as a central conduit for delivering advertisements, enabling advertisers and publishers to track the distribution of their online or television advertisements and to control the rotation and distribution of their advertisements across the Internet or television system from one location. The advertisements can be stored on the CAS for later delivery, can be transmitted to the CAS and then delivered from the CAS upon receiving an ad request, or can be delivered from another source in response to an ad request received and routed by the CAS. Examples of third-party ad servers include DoubleClick's DART for Publishers central ad server (also known as DFP) and DoubleClick's DART for Advertisers central ad server (also known as DFA). In some cases, a CAS can be owned or used by a TVP, an ISP, an STB provider or modem provider, an online content provider, a profile aggregator, a profile distributor, an ad broker, an ad network, an ad exchange, an ad agency, an online advertiser, a media buying firm, a TV advertiser, a TV ad space owner, or a TV content provider, representatives or proxies of any of those entities, or other entities. In some instances, the CAS will operate independently of an ISP or TVP.

Profile provider—an entity that has or collects profile information that is used to target advertisements. In the context here, the profile provider typically cooperates with a CAS, which receives all or part of the profile information from the profile provider for use in targeting television or online advertisements. User profile information derived from online or television activity can include, for example, observed online behavior of a user accessing the Internet (e.g., viewed online content viewed or accessed, online searches performed, online purchases made, or times and dates of such behavior), observed viewing or interaction behavior of a television viewer (e.g., television programs or ads viewed, responses to interactive programs or advertisements, or times and dates of such behavior), or demographic information collected from an Internet user or television viewer.

Examples of profile providers can include, but are not limited to, any entity that owns or uses: (1) a visited Internet site server; (2) a server delivering content, images, audio, video, text, or any combination directed to an online user interface device (such as a computer or other online interface device) via an online access device (such as a modem or router), either directly or indirectly (e.g., via a redirect); (3) a server delivering content, images, audio, video, text, or any combination directed to a television via a set-top box; (4) an ad server delivering an ad to an online user interface device via an online access device; (5) an ad server delivering a television ad to a television via a set-top box; (6) a server recording an activity conducted from an online user interface device such as a click on an ad or a link to an ad, a viewing of an ad, a click on a link to particular content, a search, a request for product information, receipt of particular content, a product purchase, a telephone call made, or any other selected and definable user activity; (7) a server recording an activity conducted through a user's television such as a click on an ad or a link to an ad, a viewing of an ad, a click on a link to particular content, a request for product information, receipt of particular content, a product purchase, or any other selected and definable user activity; or (8) a server facilitating instant messages or any other kind of communication on behalf of the user.

Another example of a profile provider is: (9) a company sponsoring and having access to a program located on the user's computer or other online user interface device or on the user's set-top box that can observe the user's online or television activity (with the user's permission), such as a browser toolbar or desktop search software. A profile provider, broadly, can be: (10) any entity (including an ISP, TVP, or ISP/TVP) able to collect behavioral profiles (observed online activity or observed viewing or viewing-related activity) or demographic profiles (provided by the user), typically including a device identifier (e.g., a set-top box identifier or an online access identifier) used when the profile was observed or collected and the date and time the profile was observed or collected, regardless of whether or not the entity collected a given profile directly through contact with the user's computer or television or indirectly from another entity such as those listed in this or the previous paragraph. In some cases, a user's online or viewing activity will result in direct contact between the television (via a set-top box) or the online user interface device (via an online access device) and the profile provider, e.g., if the profile provider is an online commerce site, the user makes a purchase at the site, and the online commerce site generates a profile for that user. In other instances there may be no direct contact between the profile provider and the user, e.g., if the user makes a purchase at an online commerce site that in turn reports information pertaining to the user to the profile provider. In some situations, also, a profile provider might also own or otherwise control a CAS, in which case user profiles can be immediately available to the CAS without need for transmission between separate entities.

Profiles or partial profiles provided by a profile provider to a CAS can contain any quantity of profile information, such as, in one example, just an online access IP address or set-top box IP address or other STB identifier used by a person at the time his profile was collected and the identity of the profile provider. The profile can include, e.g., a profile identifier or profile name, a username, or a login ID; the profile can be referenced by or included in a cookie or tag placed on a user's STB or online user interface device. The IP address can be provided by the profile provider itself or might be obtained by the CAS when a user engages in any online or television activity or provides an item of demographic information and is redirected by a profile provider to the CAS. Multiple set-top box identifiers or online access identifiers (such as IP addresses) can be associated with a single user profile if those identifiers change over time. In another example, a profile can be more extensive and can include demographic or behavioral information, such as an extensive browsing history, shopping or purchase histories, content or programs viewed, and other information concerning the user's characteristics or the user's activities. In some instances a profile includes PII; in other instances it does not. Although the profile provider is an entity, many or most of the actions attributed to the profile provider are actually performed by equipment under the administrative control of the profile provider, such as computers, servers, software running on those computers or servers, network connection hardware or software, or other equipment. Such actions may still be characterized as being performed "by the profile provider," whether performed automatically, semi-automatically, or manually.

Personally Identifiable Information (PII)—information that can be used to identify a specific person, including but not limited to: name, Social Security number (SSN), date of birth, street address, email address, static IP address (if any), phone number (home, work, wireless), financial account numbers (bank accounts, credit accounts, or any other financial data), driver's license number, vehicle registration number, vehicle license number, facial photographs, fingerprints, handwriting or signature, or any other information that can assist in identifying a specific person.

Non-Personally Identifiable Information (non-PII)—information about a person that typically cannot be used to specifically identify that person, including but not limited to: city, state, or country of residence, age, gender, race, ethnicity, school or workplace (if sufficiently large), salary or income, hobbies, dynamically assigned IP addresses, online sites visited, online searches conducted, or other information that is useful to know about a person but does not by itself allow one knowing the information to identify the particular person.

Cookie—a text file placed on a user's computer by a server that also serves content to the user's computer using browser software. The cookie typically can be read or altered only by a server operating under the same Internet domain as the server that originally placed the cookie. The cookie file can be used to identify a computer that has already been in contact with the same domain and can also be used to store PII or non-PII pertaining to a user of that computer. In a first example, a cookie can store non-PII such as previous searches conducted at the site, or pages viewed or visited at the site, by the computer user. In a second example, a cookie can be used to store a username used by the user to access a site, customized preferences of the user, or various pieces of PII. A cookie file can also be created, altered, or deleted by software located on the user's computer.

Television advertisement (TV ad)—a full screen video ad, a partial screen video ad, a banner ad, a text ad, an audio ad, or any other form of advertisement suitable for delivery to and visual or audible presentation by a television set.

Figure 1:
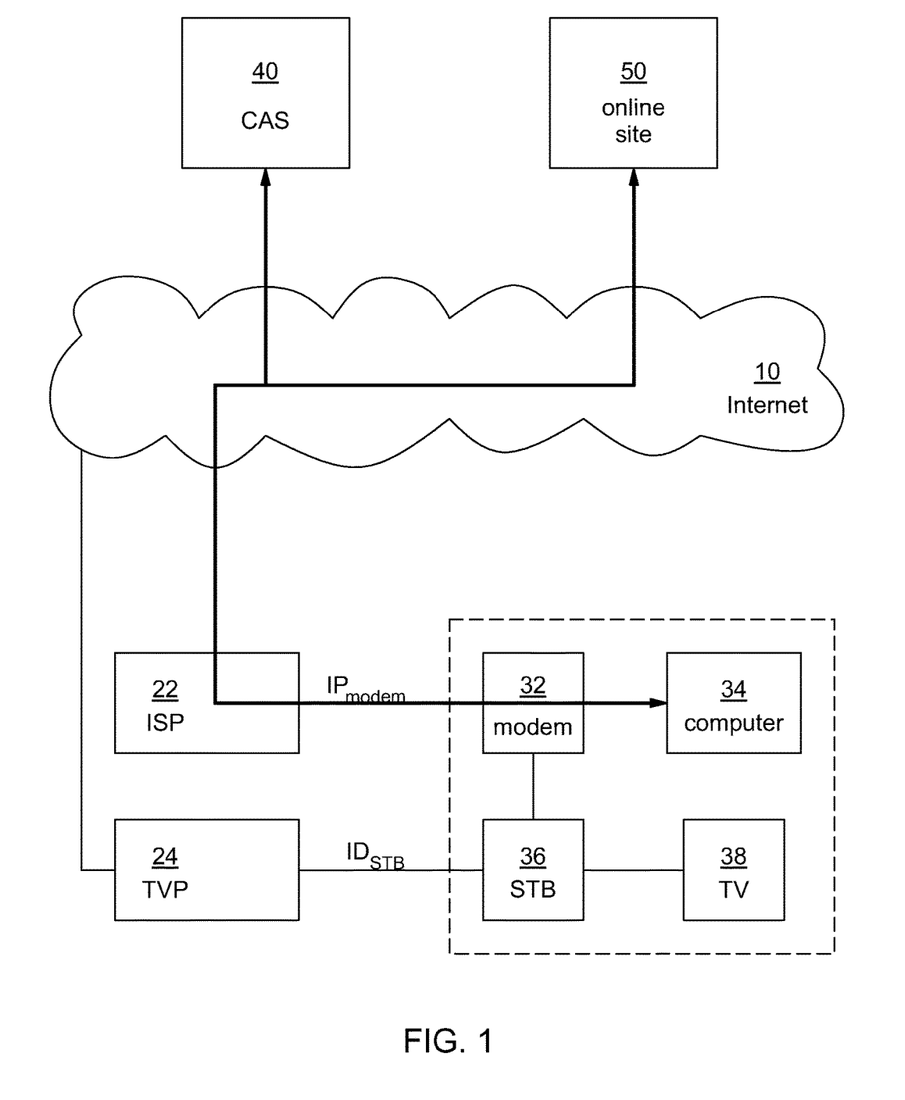
FIG. 1 illustrates schematically exemplary interactions among an online user, an online site, and a central ad server as an online user profile is collected or generated.

As illustrated schematically in FIG. 1, an online user accesses the Internet 10 via the user's Internet service provider (ISP) 22 using computer 34 and modem 32. As the user engages in various online activity, an online user profile is collected or generated by one or more profile providers (e.g., the owner or controller of central ad server (CAS) 40 or online site 50). That online user profile can include demographic information concerning the user, can include information concerning the user's online behavior, or can include information declared online by or about the user. These categories of profile information can overlap.

Examples of demographic information may include but are not limited to: age, gender, race, ethnicity, religion, educational level, income, debt level, credit report entries, job or profession, employment status, employer, marital status, parental status, home owner or renter, or geographic location. Examples of behavioral information may include but are not limited to: online content viewed or accessed, online searches performed, online purchases made, or times and dates of such behaviors. Examples of declared information may include but are not limited to a user's declared interest in a hobby, social or leisure activity, vocation or avocation, or particular subject area. The profile can contain personally identifiable information, or not.

Information in the online user profile can be obtained or generated by soliciting information from the user, by tracking or recording online activity of the user, or by inference based on solicited, tracked, or recorded information.

Online user profile information can be stored locally on a user's computer (e.g., as cookies) or remotely (e.g., on one or more servers, ad servers, or online sites). In some instances the entire online user profile can be stored at a single location, and in other instances online user profile information can be distributed over multiple locations. A single entity can control such multiple locations, or separate entities can control different ones of the locations separately.

The information from the online user profile can be used to select targeted television advertisements for presentation to the online user while that user watches television.

Figure 2:
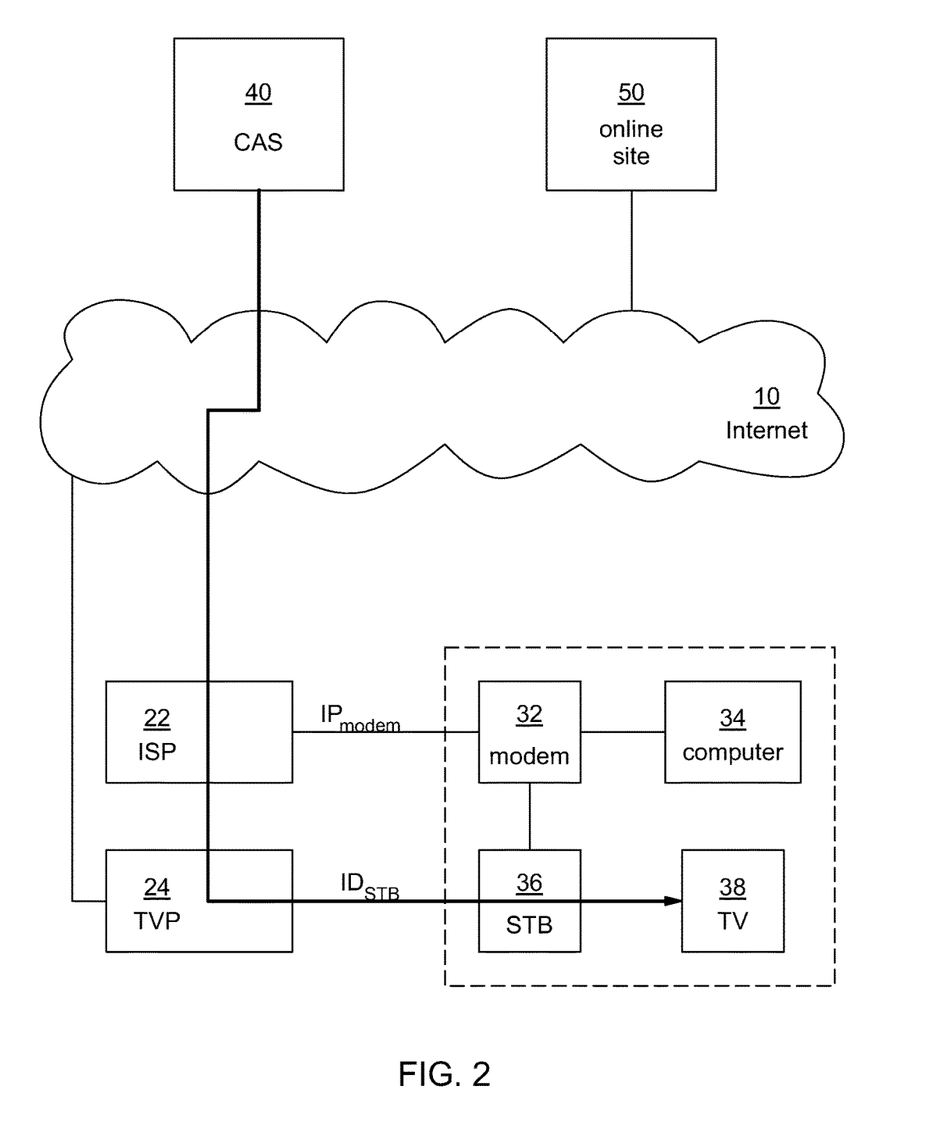
FIG. 2 illustrates schematically exemplary transmission of a targeted television advertisement to a user's set-top box (STB).

An association between the online user profile and a corresponding set-top box (by which the user receives any suitable type of television service, e.g., cable, IPTV, VOD) is required to enable delivery or transmission of the targeted television advertisement to a television at the user's location (as in FIG. 2). Such an association can be established or provided in any suitable way, including those disclosed in the above-referenced, incorporated applications Ser. Nos. 11/736,544 and 11/968,117.

In one example, the online user profile and the set-top box identifier are associated by each being associated with the same corresponding online access identifier (e.g., an IP address, or a portion thereof, of a modem, network adapter, router, or other online access device or user interface device). In one implementation, the online access identifier and the set-top box identifier can be associated by the online access identifier being referenced or included in the online user profile. In another implementation, the online access identifier and the first set-top box identifier can be associated in a database. The online user profile and the set-top box identifier can be associated with or without employing personally identifiable information concerning the user, as needed, desired, or required.

In another example, the online user profile originates at least partly from an online user interface device (e.g., a computer), and the online user profile and the set-top box identifier are associated by the set-top box and the online user interface device being connected to a common local area network (LAN). In one such arrangement an online access identifier corresponding to the set-top box and an online access identifier corresponding to the user interface device are the same (e.g., the 32-bit IP address of a modem that connects the LAN to the Internet in accordance with IPv4; as shown in FIGS. 1 and 2). In another such arrangement, the online access identifier corresponding to the set-top box and the online access identifier corresponding to the user interface device share a common portion of their respective online access identifiers (e.g., they share the first 64 bits of their respective 128-bit IP addresses used in accordance with IPv6). Other such common-LAN arrangements can be employed. Although a connection between modem 32 and STB 36 is shown in FIGS. 1 and 2, such a connection need not be present in every implementation, including those described in the previous paragraph.

The targeted television advertisement can be delivered or transmitted to the user's set-top box (STB) 36 from any suitable entity (e.g., from CAS 40 via TVP 24 as FIG. 2 illustrates, from CAS 40 via ISP 22, from online site 50, or from another server, ad server, or online site). The entity selecting the targeted television advertisement can present or arrange for the presentation of the advertisement, or cause another entity to present or arrange for the presentation of the advertisement. Those actions can include transmitting the selected television advertisement, transmitting a title or other identifier of the selected television advertisement, redirecting the online user to an ad server, or transmitting instructions for or other information used for identifying, locating, or presenting the selected television advertisement.

The targeted television advertisement can be delivered or transmitted to STB 32 at the time it is to be presented, or it can be delivered or transmitted in advance of display and stored in STB 32 or in a digital video recorder (DVR; not shown). The targeted television advertisement is presented via STB 32 on television 38 or other suitable television display device.

It is desirable to increase the likelihood that the targeted television advertisement is presented at a time when the user, specifically the same person whose online user profile caused the targeted television advertisement to be selected, is watching television. A television advertisement targeted based on an online user profile of a first user is more likely to be wasted or ineffective if presented while a different, second user is watching television.

The likelihood of presenting the targeted television advertisement while the intended target (i.e., user) is watching television can be increased by presenting the targeted television advertisement in association with a particular television program or channel for which that user has indicated a specific preference or affinity. The user is more likely to see a television advertisement targeted at that user (based on that user's online profile) if presented in association with that user's favored or preferred television program or channel.

A user's online profile can include information that indicates the user's preference for a particular television program or channel. A user's preference for a particular television program or channel can be indicated explicitly or implicitly. Examples of explicit indication can include, but are not limited to: (a) the user answering a survey question (e.g., "What are your favorite television programs?") or (b) the user listing one or more favorite television programs or channels as part of a social networking site profile.

Examples of implicit indication can include, but are not limited to: (a) the user repeatedly visiting the online site of a television program or channel, (b) the user downloading or watching one or more episodes of the television program online (as opposed to via the user's television service), (c) the user participating in an online forum or discussion group concerning the television program or channel, (d) the user purchasing (online) merchandise associated with the television program or channel (e.g., clothing, books, magazines, screensavers, ringtones, or music soundtrack), (e) the user viewing online content or making an online purchase in response to an earlier television advertisement shown during the television program or on the television channel, in a manner that would identify the TV program or channel as having been watched by that user, e.g., (i) because the user's activity indicated use of a coupon, discount, or code that was part of the advertisement during the program or on the channel in question, or (ii) because the ad was delivered only during a single program, a small number of programs, or on a single channel, or (f) the user repeatedly consulting an online program guide and viewing entries concerning a particular program or channel.

An example of a combination of explicit and implicit indication is considering TV programs as having been indicated when they share the same themes as one or (better) a variety of TV programs explicitly identified online as favorites. For example, if a user explicitly indicates three or more science fiction programs as favorites, a system might consider all science fiction programs as having been implicitly indicated.

In whatever way the online user profile comes to include information indicating the user's preference for the particular television program or channel, that information can be used to select that particular television program or channel as a suitable one for presenting a targeted television advertisement. The exemplary flow diagram of FIG. 3 illustrates that process schematically; the order of steps is illustrative and can vary as needed or desired.

Figure 3:
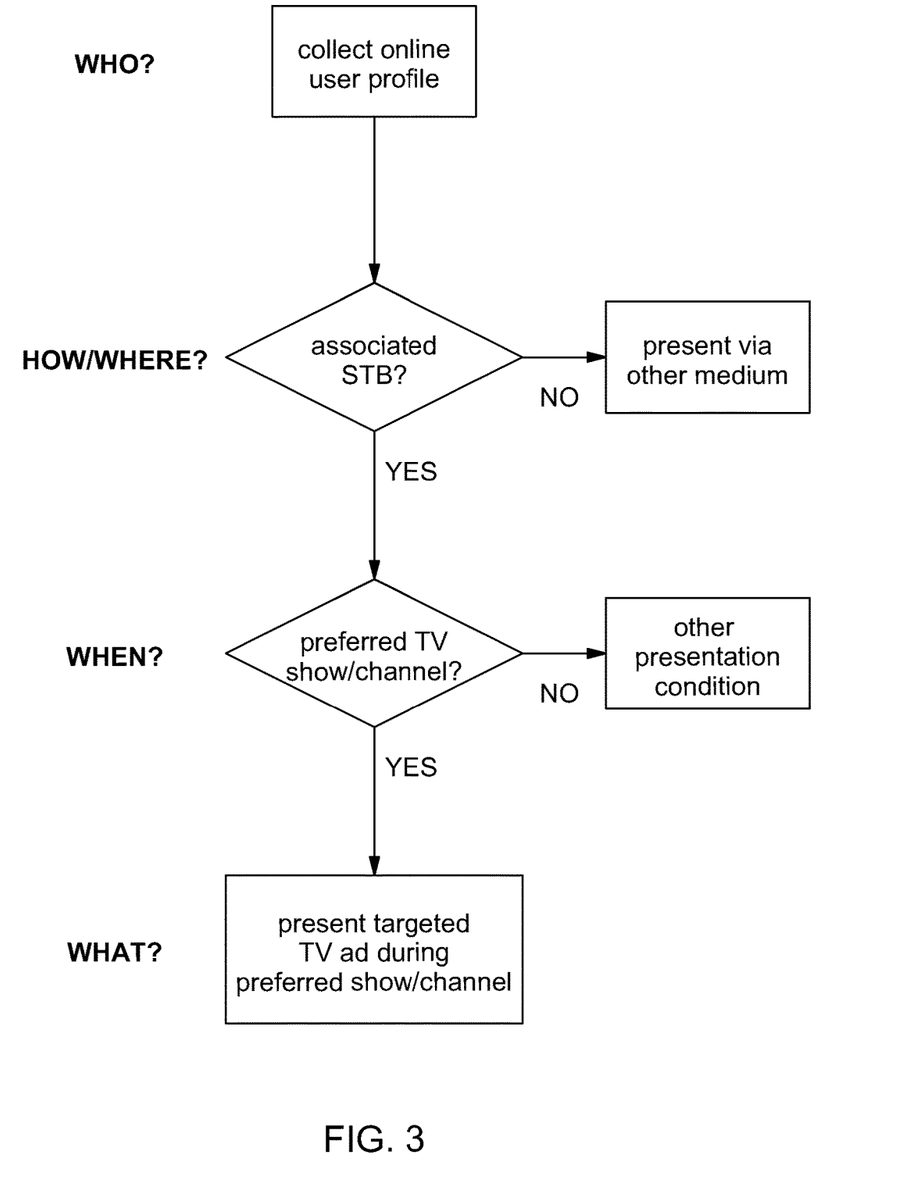
FIG. 3 illustrates schematically an exemplary process for presenting a targeted television advertisement during a selected television program or on a selected television channel.

As illustrated in FIG. 3, the targeted television advertisement can be presented automatically in association with presentation (via the user's set-top box) of the selected television program or channel. The television programs viewed via the user's set-top box (during broadcast, unicast, or recorded playback; via cable, IPTV, VOD, Internet-based source, or other suitable source) can be monitored, and a program that has been indicated as preferred or as a favorite can be recognized. Such monitoring can be done locally by the set-top box, remotely by a server to which the set-top box reports its activity, remotely by a server delivering the television program to the set-top box, or by other suitable arrangements. Once a program is thus recognized, the targeted television advertisement, either selected in advance or in real-time, can be inserted into the recognized, selected television program by the server delivering the program, by the set-top box, or by another server structured and connected for that purpose.

Most often, the targeted television advertisement is selected at least in part based on information from the online user profile unrelated to the specifically preferred television program or channel. For example, a first user might search for car insurance online and might also (separately) indicate that "Law & Order" is a favorite television show. Car insurance and "Law & Order" are not necessarily related, yet an exemplary method might allow presentation of a television advertisement for car insurance during an episode of "Law & Order" shown via the first user's set-top box. Under the same exemplary method, a second user who also indicated that "Law & Order" is a favorite television show, but who browsed for a particular travel destination at an online travel site, might receive a television advertisement touting flights to or hotels at the destination, also presented during an episode of "Law & Order" shown via the second user's set-top box.

In a second example, a first user searches online for automobiles and indicates (separately, and not necessarily during the same online session) that "Lost" is a favorite television show. A second user at the same household (or other common physical location), browses a medical information site (probably at a time different from when the first user performed searches) and indicates (separately, and not necessarily during the same online session as the second user browsed the medical information site) that "The Discovery Channel" is a favorite television channel.

The two users can have distinct corresponding online user profiles through use of different computers or through use of different user accounts or user IDs on the same computer. If two users in a single household (or other single physical location) share a common online access IP address or other similar online access identifier (e.g., by sharing a computer, modem, or router), their profiles can nevertheless be distinct and can be distinguished by different profile identifiers (e.g., different browser cookies, one of which is associated with each profile). If the two users have differing online access identifiers (e.g., differing IP addresses or differing portions thereof in an IPv6 implementation), their respective profiles can be distinguished by differing profile identifiers or by the differing online access identifiers.

On the basis of those distinct profiles (that are each associated with the set-top box identifier), an exemplary method might cause presentation of a television advertisement for automobiles during replay of an episode of "Lost" via the set-top box, and a television advertisement for a health insurance plan during replay of "Discovery Channel" shows via the same set-top box (or a different set-top box but also located at the users' common physical location and also associated with the online user profiles).

In a third example, a first online user profile includes demographic information indicating that a first user is a 46-year-old female engineer with a master's degree, is married with two children, and has a household income of $130,000/year. The same online user profile also contains behavioral information showing that she repeatedly checks an online program guide and views entries for "MythBusters" in that guide.

According to an embodiment using the information in this example, an ad server or computerized method can select a television advertisement based on the demographic information in the first online user profile. For example, the ad server may be programmed to show ads for calcium supplements to highly educated women over 40 with kids and high disposable income because that product does particularly well among that demographic subgroup. If so, the calcium supplement ad can be presented in association with an episode of "Myth Busters" via the first user's set-top box. If a second online user profile includes exactly the same demographic information for a second online user, but that second user has repeatedly visited the online site for "The Daily Show," the embodiment can allow the ad server or computerized method to select the very same targeted television ad, for the same reasons, but present that ad via the second user's set-top box during an episode of "The Daily Show" instead.

The examples given are intended to represent examples of types of program or advertisement selections, in various classes of attributes or characteristics, rather than specific cut-offs. For example, the ages are selected arbitrarily and could be changed to different specific ages or age ranges, and the example interests and hobbies are arbitrary and not central to the point being made. The same is true for examples given elsewhere herein.

As illustrated in the foregoing examples, the television advertisement selected for targeted presentation based on information in the online user profile may or may not be directly related to that profile information. In different cases, the relationship between the profile and the ad may be direct (e.g., search online for a particular concert ticket, get targeted television ads for that concert), indirect (e.g., browse online at the Disney site, get targeted television ads for Anaheim hotels), generally behavioral (e.g., browse online at a hunting site, get targeted television ads for beer), or strictly demographic (e.g., be a 50 year-old woman, get targeted television ads for anti-wrinkle cream).

The disclosed systems and methods also provide opportunities for delivering targeted television ads that might be considered "counterintuitive." For example, a 70 year-old retired concert pianist who regularly participates in an online forum concerning professional wrestling can be presented with ads for classical music performances or recordings during episodes of "WWE Raw" shown via her set-top box—an advertising opportunity that would not be typically utilized or even considered using more traditional advertising models.

Presentation of targeted television advertisements in association with a user-specified preferred television channel (as opposed to show) is likely more effective for specialized or niche television channels (e.g., Discovery Channel, Animal Planet, Comedy Central, History Channel) rather than general-purpose television networks (e.g., ABC, CBS, NBC, Fox), and it may be desirable to limit implementation of the disclosed methods to such niche channels. However, methods in accordance with the embodiments discussed here can apply to user selection of preferred channels of any type or having any degree of specificity (from niche channels to major networks).

Figure 4A:
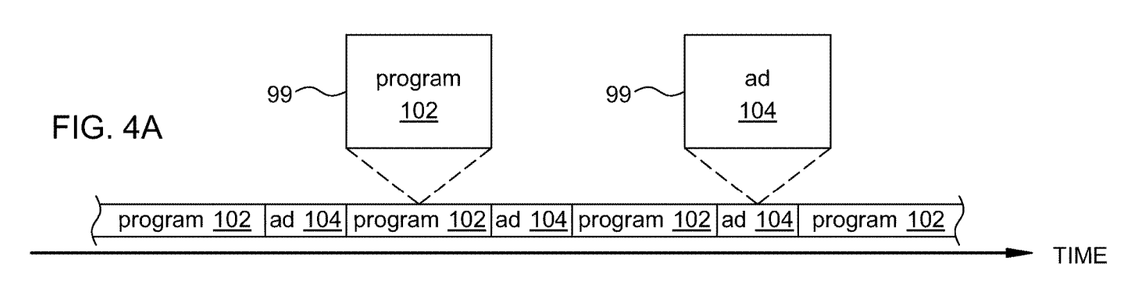
FIG. 4A illustrates schematically a targeted television advertisement temporally interleaved with a selected television program.
Figure 4B:
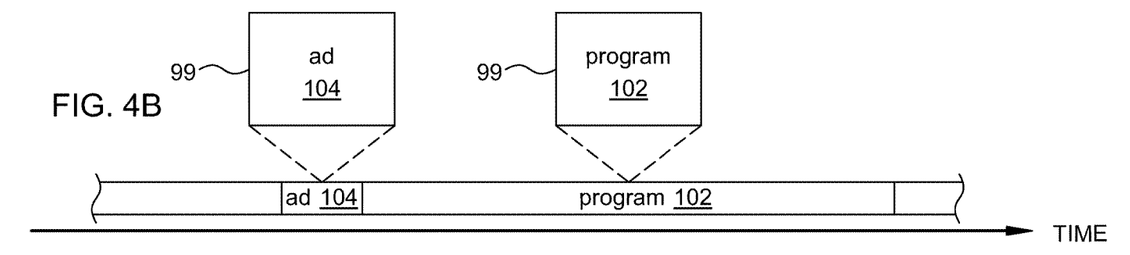
FIGS. 4B and 4C illustrate schematically a targeted television advertisement presented immediately before or immediately after a selected television program.
Figure 4C:
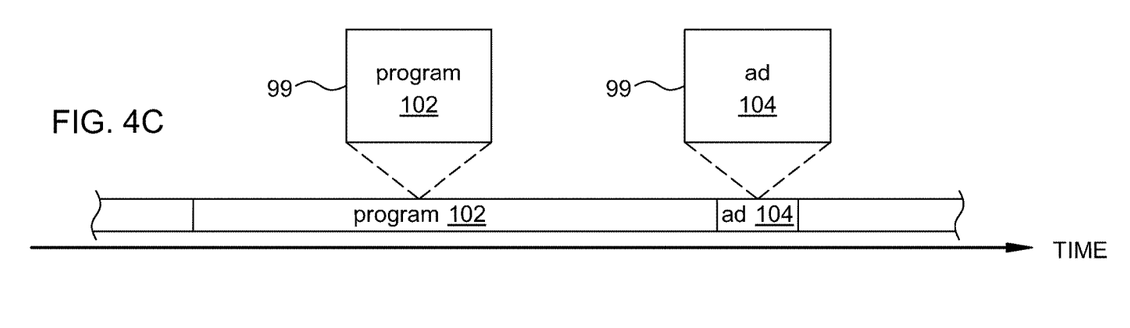
Figure 5A:
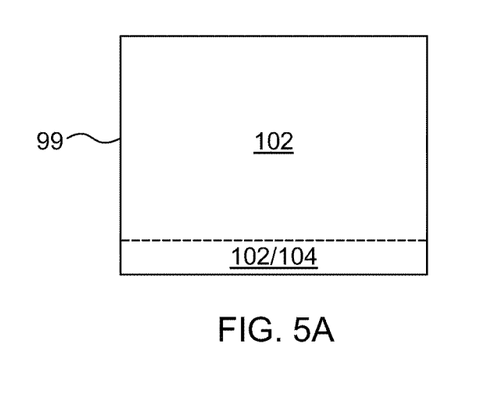
FIGS. 5A-5E illustrate schematically a targeted television advertisement spatially combined with a selected television program.
Figure 5B:
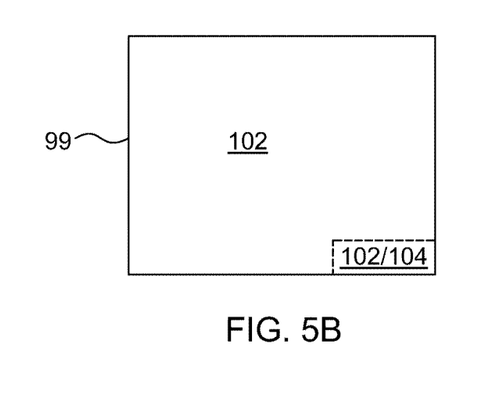
Figure 5C:
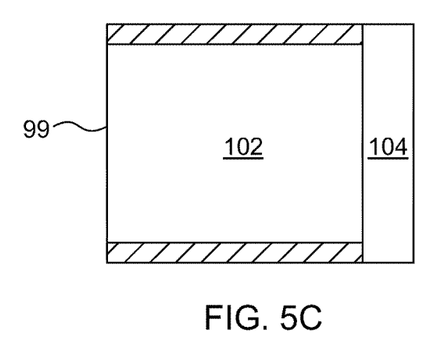
Figure 5D:
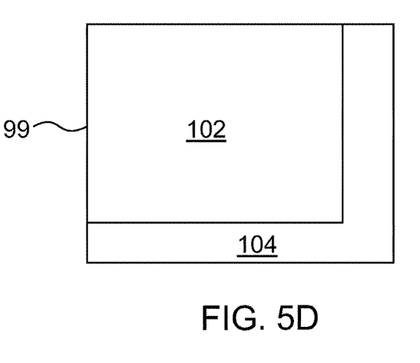
Figure 5E:
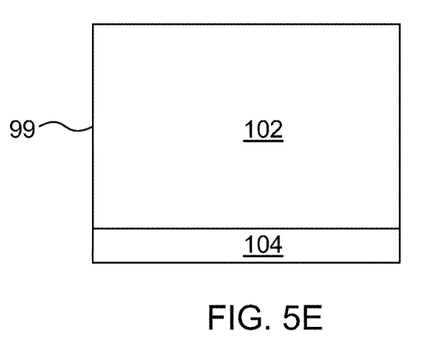

Presentation of a targeted television advertisement in association with a specifically preferred television program or channel can be achieved in a variety of ways. In one example, targeted television advertisement 104 can be shown temporally interleaved with selected television program 102 (FIG. 4A) or immediately before or immediately after selected television program 102 (FIGS. 4B and 4C), or it can be shown spatially combined with selected television program 102 on television screen 99 (e.g., overlaid as in FIGS. 5A and 5B or juxtaposed as in FIGS. 5C-5E). The selected television program 102 may or may not also include other temporally interleaved or spatially combined advertisements (not shown). The selected television advertisement can presented during a latter portion of a television program immediately preceding the selected program or during an initial portion of a television program immediately following the selected program. In any of those examples, the targeted television advertisement can be presented immediately before, during, or immediately after broadcast presentation of the selected television program, or immediately before, during, or immediately after delayed presentation of the selected television program (e.g., by recording and later viewing with a DVR or via a video-on-demand system).

If the ad server elects to present a targeted television advertisement in association with a user-preferred television channel (as opposed to a preferred show), then the targeted advertisement can be shown, in accordance with different embodiments, (a) during any program shown on the preferred channel or (b) during only certain programs on that channel, in any of the ways described above.

The examples discussed above, although somewhat numerous, describe only a few examples of the disclosed systems and methods, and it is recognized that various of the specifically discussed embodiments fall with broad categories of embodiments involving a targeted television advertisement being (a) selected based on behavioral, demographic, or declared information in an online user profile, and (b) presented in association with a television program or a television channel for which an online user has specifically indicated a preference (explicitly or implicitly). Myriad other examples, cases, and variations exist within the scope of such broader disclosed classes of embodiments, despite all such examples not having being specifically set forth herein.

In any of the disclosed implementations, each of the necessary steps can be performed by a single entity (such as a profile provider) or with collaboration of multiple different entities (or equivalently, by computer systems controlled by a single entity or multiple computer systems each controlled by a different entity). For example, online user profile information indicating a preferred television program can be collected by an online site controlled by one entity, while the online user profile information used to select the targeted advertisement can be collected by an ad server controlled by another entity.

Other specific examples include, but are not limited to: (a) a single entity can provide at least a portion of an online user profile, select a targeted television ad based on the online user profile, select a television program based on the online user profile, and arrange presentation of the selected ad in association with the selected program; (b) a first entity can select a targeted television ad based on online user profile information provided by a second entity, select a television program based on online user profile information provided by a third entity, and arrange presentation of the selected ad in association with the selected program; (c) a first entity can select a targeted television ad based on an online user profile, a second entity can select a television program based on the online user profile, and the second entity can arrange presentation of the selected ad in association with the selected program; or (d) a first entity can select a targeted television ad based on an online user profile, a second entity can select a television program based on the online user profile, the second entity can arrange transmission of the selected ad and the selected program to a television provider, and the television provider can arrange presentation of the selected ad in association with the selected program. Myriad other scenarios can be implemented.

In any of the examples including delivery of targeted television advertisements, those television ads can be provided by a wide variety of sources or entities. Above-referenced, incorporated applications Ser. Nos. 11/736,544 and 11/968,117 disclose examples of various sources for targeted television advertisements.

In any of the disclosed implementations, revenue can be generated and distributed among the involved entities in a wide variety of ways. Above-referenced, incorporated applications Ser. Nos. 11/736,544 and 11/968,117 disclose various examples, including some including the feature of compensating a profile provider for enabling targeting of television advertisements.

The systems and methods disclosed herein can be implemented as general or special purpose computers or other programmable hardware devices programmed through software, or as hardware or equipment "programmed" through hard wiring, or a combination of the two. Computer programs or other software, if used, can be implemented in temporary or permanent storage or in replaceable media, such as by including programming in microcode, object-oriented code, web-based or distributed software modules that operate together, RAM, ROM, CD-ROM, DVD-ROM, hard drives, thumb drives, flash memory, optical media, magnetic media, semiconductor media, or any future storage alternatives.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open-ended terminology, with the same meaning as if the phrase "at least" were appended after each instance thereof.

What is claimed is:

1. An automatic, method implemented by a computer system comprising: with the computer system,
   automatically arranging for or transmitting instructions for presenting, in association with presentation of a first television program or channel, a first television advertisement, and
   automatically arranging for or transmitting instructions for presenting, in association with presentation of a second television program or channel, a second television advertisement,
   wherein:
   (a) (i) a relationship, between the first television program or channel and a first online user profile is identified based at least in part on information from the first online user profile, which information indicates a first user's preference for the first television program or channel, to presume a user who watches the first television program or channel, and (ii) a relationship, between the second television program or channel and a second online user profile is identified based at least in part on information from the second online user profile, which information indicates a second user's preference for the second television program or channel, to presume a second user who watches the second television program or channel;
   (b) the first online user profile and the second online user profile are each one of a plurality of online user profiles associated with an identifier of a first set-top box;
   (c) (i) the first television advertisement is selected based at least in part on additional information from the first online user profile that is unrelated to the first television program or channel, and (ii) the second television advertisement is selected based at least in part on additional information from the second online user profile that is unrelated to the second television program or channel;
   (d) (i) the information from the first online user profile indicating the first user's preference for the first television program or channel has been collected from online activity of the presumed first user through a first online user interface device, and (ii) the information from the second online user profile indicating the second user's preference for the second television program or channel has been collected from online activity of the presumed second user through a second online user interface device;
   (e) the first television advertisement and the first television program or channel are presented via the first set-top box, and the second television advertisement and the second television program or channel are presented via the first set-top box; and
   (f) the first television advertisement is selected for presentation in association with the first television program or channel based on the first online user profile but would not have been selected for presentation in association with the first television program or channel based on the second online user profile.

2. The method of claim 1 wherein the first television program or channel is a television program and the first online user profile includes an explicit indication of a preference for the television program.

3. The method of claim 1 wherein the first television program or channel is a television program and the first online user profile includes an implicit indication of a preference for the television program.

4. The method of claim 1 wherein the additional information from the first online user profile that is used to select the first television advertisement includes demographic information concerning the user.

5. The method of claim 1 wherein the additional information from the first online user profile that is used to select the first television advertisement includes information concerning online activity of the user.

6. The method of claim 1 wherein the additional information from the first online user profile that is used to select the first television advertisement includes declared information concerning the user.

7. The method of claim 1 wherein the first online user profile and the first set-top box identifier are associated by each being associated with a common online access identifier.

8. The method of claim 7 wherein the online access identifier and the first set-top box identifier are associated by the online access identifier being referenced or included in the first online user profile.

9. The method of claim 7 wherein the online access identifier and the first set-top box identifier are associated in a database.

10. The method of claim 7 wherein the online access identifier and the first set-top box identifier are associated by an online user interface device that corresponds to the online access identifier and the first set-top box being connected to a common local area network.

11. The method of claim 1 wherein the first online user profile and the first set-top box identifier are associated without employing personally identifiable information concerning the user.

12. The method of claim 1 wherein the first television advertisement is presented in association with broadcast presentation of the first television program or channel.

13. The method of claim 1 wherein the first television advertisement is presented in association with delayed presentation of the first television program or channel.

14. The method of claim 1 wherein the first television advertisement is spatially combined or temporally interleaved with the first television program or channel.

15. The method of claim 1 wherein the first television advertisement is presented immediately before or immediately after presentation of the first television program or channel.

16. The method of claim 1 wherein the computer system performs the act of part (a) by identifying the relationship and performs the act of part (c) by selecting the advertisement.

17. The method of claim 1 wherein the computer system performs the act of part (a) by identifying the relationship and, as to the act of part (c), the computer system receives an indication of selection of the advertisement.

18. The method of claim 1 wherein, as to the act of part (a), the computer system receives an indication of identification of the relationship, and wherein the computer system performs the act of part (c) by selecting the advertisement.

19. The method of claim 1 wherein, as to part (a), the computer system receives an indication of identification of the relationship and, as to part (c), the computer system receives an indication of selection of the advertisement.

20. A computer system comprising at least one computer programmed and connected:
   to arrange automatically for or transmit instructions for presenting, in association with presentation of a first television program or channel, a first television advertisement and
   to arrange automatically for or transmit instructions for presenting, in association with presentation of a second television program or channel, a second television advertisement,
   wherein:
      (a) (i) a relationship, between the first television program or channel and a first online user profile is identified based at least in part on information from a first online user profile, which information indicates a first user's preference for the first television program or channel, to presume a user who watches the first television program or channel, and (ii) a relationship, between the second television program or channel and a second online user profile is identified based at least in part on information from the second online user profile, which information indicates a second user's preference for the second television program or channel, to presume a second user who watches the second television program or channel;
      (b) the first online user profile and the second online user profile are each one of a plurality of online user profiles associated with an identifier of a first set-top box;
      (c) (i) the first television advertisement is selected based at least in part on additional information from the first online user profile that is unrelated to the first selected television program or channel, and (ii) the second television advertisement is selected based at least in part on additional information from the second online user profile that is unrelated to the second television program or channel;
      (d) (i) the information from the first online user profile indicating the first user's preference for the first television program or channel has been collected from online activity of the first user through a first online user interface device, and (ii) the information from the second online user profile indicating the second user's preference for the second television program or channel has been collected from online activity of the presumed second user through a second online user interface device;
      (e) the first television advertisement and the first television program or channel are presented via the first set-top box, and the second television advertisement and the second television program or channel are presented via the first set-top box; and
      (f) the first television advertisement is selected for presentation in association with the first television program or channel based on the first online user profile but would not have been selected for presentation in association with the first television program or channel based on the second online user profile.

21. An article comprising a tangible medium that is not a transitory propagating signal encoding computer-readable instructions that, when applied to a computer system comprising at least one computer, instruct the at least one computer
   to arrange automatically for or transmit instructions for presenting, in association with presentation of a first television program or channel, a first television advertisement and
   to arrange automatically for or transmit instructions for presenting, in association with presentation of a second television program or channel, a second television advertisement,
   wherein:
      (a) (i) a relationship, between the first television program or channel and a first online user profile is identified based at least in part on information from a first online user profile, which information indicates a first user's preference for the first television program or channel to presume a user who watches the first television program or channel, and (ii) a relationship, between the second television program or channel and a second online user profile is identified based at least in part on information from the second online user profile, which information indicates a second user's preference for the second television program or channel, to presume a second user who watches the second television program or channel;
      (b) the first online user profile and the second online user profile are each one of a plurality of online user profiles associated with an identifier of a first set-top box;
      (c) (i) the first television advertisement is selected based at least in part on additional information from the first online user profile that is unrelated to the first television program or channel, and (ii) the second television advertisement is selected based at least in part on additional information from the second online user profile that is unrelated to the second television program or channel;

(d) (i) the information from the first online user profile indicating the first user's preference for the first television program or channel has been collected from online activity of the first user through a first online user interface device, and (ii) the information from the second online user profile indicating the second user's preference for the second television program or channel has been collected from online activity of the presumed second user through a second online user interface device;

(e) the first television advertisement and the first television program or channel are presented via the first set-top box, and the second television advertisement and the second television program or channel are presented via the first set-top box; and (f) the first television advertisement is selected for presentation in association with the first television program or channel based on the first online user profile but would not have been selected for presentation in association with the first television program or channel based on the second online user profile.

\* \* \* \* \*